United States Patent [19]
Suzuki et al.

[11] Patent Number: 5,667,455
[45] Date of Patent: Sep. 16, 1997

[54] REDUCTION GEAR UNIT

[75] Inventors: Hiroshi Suzuki, Yokohama; Hayato Oumi, Chigasaki, both of Japan

[73] Assignee: NSK Ltd., Tokyo, Japan

[21] Appl. No.: 562,248

[22] Filed: Nov. 22, 1995

Related U.S. Application Data

[63] Continuation of Ser. No. 144,286, Oct. 27, 1993.

[30] Foreign Application Priority Data

Oct. 30, 1992 [JP] Japan .................. 4-314375
Nov. 18, 1992 [JP] Japan .................. 4-331252

[51] Int. Cl.⁶ .............. F16H 57/08; F16C 19/50
[52] U.S. Cl. .......................... 475/331; 384/512
[58] Field of Search ................. 475/331, 335, 475/346, 348; 384/512

[56] References Cited

U.S. PATENT DOCUMENTS

| | | | |
|---|---|---|---|
| 2,773,401 | 12/1956 | Douglas | 475/331 |
| 2,998,735 | 9/1961 | Elfes | 475/331 |
| 3,821,908 | 7/1974 | Marsch et al. | 475/331 |
| 4,656,890 | 4/1987 | Marquardt | 475/331 |

FOREIGN PATENT DOCUMENTS

| | | | |
|---|---|---|---|
| 2580996 | 10/1986 | France | 475/335 |
| 4-3147 | 1/1992 | Japan . | |
| 4-185939 | 7/1992 | Japan . | |

*Primary Examiner*—Charles A. Marmor
*Assistant Examiner*—Sherry Lynn Estremsky
*Attorney, Agent, or Firm*—Helfgott & Karas, P.C.

[57] ABSTRACT

The rolling-bearing unit with reduction gear of this invention includes, an outer ring or race having outer ring raceways formed on its inside circumferential surface, an inner ring or race having inner ring raceways formed on its outside circumferential surface and which face the outer ring raceways, several rolling bodies located between the outer ring raceways and inner ring raceways, a ring gear formed on the inside circumferential surface of a member which is affixed with respect to the outer ring or race and which is located away from the outer ring raceway in the axial direction, several support shafts which are connected respectively at their base portion at circumferential locations on the end face of the inner ring or race and arranged so that they are parallel to the outer and inner rings or races, and planetary gears which are rotatably supported around the support shafts and which mesh with the ring gear.

4 Claims, 5 Drawing Sheets

REDUCTION GEAR UNIT

This is a continuation of application Ser. No. 08/144,286, filed Oct. 27, 1993.

DETAILED DESCRIPTION OF THE INVENTION

1. Field of the Invention

The present invention is related to a reduction gear unit, specifically the rolling-bearing unit with reduction gear for use as a reduction gear apparatus for general industrial machinery, and more particular, to be used to support the drive shaft or joint of automobiles, for example of an electric automobile.

2. Description of the Prior Art

The rotation support section for the drive shaft and joint of an electric automobile must have a function whereby it can support the rotation of the drive shaft and Joint, and it must also have a function whereby it is capable of transmitting the decelerated rotation of the drive motor to the drive shaft and joint. The construction of a device having these two functions is disclosed in Japanese Patent First Publication KOKAI No. H4-185939, and is shown in FIG. 1 in the instant application.

The cylindrical shaped housing 1 is supported by and affixed to the suspension device or motor casing using the flange 2 formed around its outside circumferential surface. An outer ring or race 3 is fitted into the inside circumferential surface of the housing 1, and prevented from coming out by a retaining ring 4. An output shaft 5 is inserted inside the housing 1, and an output flange 6 is affixed around the outside circumferential surface of this output shaft 5. Between the inside circumferential surface of this output flange 6 and the outside circumferential surface of the output shaft 5 is a spline joint section 7 which prevents relative rotation between the output shaft 5 and output flange 6. There is also a nut 8 screwed onto the axially outer end (the right end in FIG. 1) of the output shaft 5. This nut prevents the output flange 6 from coming out.

There is an inner ring or race 10 secured around the cylindrical section 9 axially extending from the base portion of the output flange 6, and there are several balls 13 in double rows between the inner ring raceways 11 formed on the outside surface of the inner ring or race 10, and the outer ring raceways 12 formed on the inside surface of the outer ring or race 3, respectively allowing the output shaft 5 and output flange 6 to rotate freely inside the housing 1. Also, there is a seal ring 14 located between the inside circumferential surface at the opening of the axially outer end of the housing 1, and the outside circumferential surface of the base portion of the output flange 6. This seal ring 14 prevents water or dust from getting into the area where the balls 13 are located, and it also prevents lubrication oil from leaking out of the section where the balls 13 are located.

Located on the axially inner end (the left side in FIG. 1) of the output shaft 5 is a support section 15 which is projected outward in the radial direction, and in this support section 15 there are several support shafts 16 equally spaced in the circumferential direction. All of the support shafts 16 are arranged so that they are parallel with the housing 1 and output shaft 5, and each provided with a planetary gear 17 which is supported through rollers 18 so that they rotate freely. A retaining ring 19 is provided so as to connect the ends of each of the support shafts 16.

On the inside circumferential surface of the axially inner end of the housing 1, there is a ring gear 20 located on the axially inner side of the outer ring or race 3, and this ring gear 20 meshes with the planetary gears 17. The planetary gears 17 also mesh with a sun gear 21. This sun gear 21 is formed around the outside surface of the axially outer end of the drive shaft 22 which is concentric with the output shaft 5.

When the ball-bearing unit with reduction gear, constructed as described above, is used, the housing 1 is supported by the suspension or motor casing by the flange 2, and the mount sections of the wheel axle and joint are affixed to and supported by the output flange 6. In this condition, when the drive shaft 22 is rotated by the motor, all of the planetary gears 17 while rotating on its axis are revolved around the sun gear 21, due to their meshing relationship with the sun gear 21 and the ring gear 20. As a result, the output shaft 5 turns at the same rpm as the speed of the planetary gears 17 revolving around the sun gear 21.

In the prior construction as shown in FIG. 1, there is a large number of parts, and so there is much work involved in manufacturing and assembling the parts. Not only does the manufacturing cost increase, but as the thickness of each part is increased in order to maintain its required strength, the weight of the entire ball-bearing unit increases. Besides this ball-bearing unit with reduction gear, another one is disclosed in Japanese Patent Publication KOKOKU No. H4-3147, however it also has a similar problem.

SUMMARY OF THE INVENTION

The rolling-bearing unit with reduction gear of this invention was made with these conditions in mind.

An object of this invention is to provide a rolling-bearing unit with reduction gear which makes it possible to reduce the manufacturing cost as well as reduce the weight by reducing the number of parts.

A reduction gear unit for reducing rotation power of this invention comprises:

- a stationary support member having an inner circumferential surface formed with an outer bearing raceway and inner teeth gear,
- an input rotating member provided radially inside the stationary support member and having an outer circumferential surface formed with outer teeth gear,
- an output rotating member provided radially inside the stationary support member for reducing the output power,
- the output rotating member having an outer circumferential surface integrally formed with an inner bearing raceway, and an axial end section from which a plurality of pins are axially extended,
- a plurality of rolling members provided between the outer bearing raceway and the inner bearing raceway, and
- an intermediate rotary gear rotatably fitted onto each of the pins and interlocked with the inner teeth gear and outer teeth gear.

DESCRIPTION OF THE PREFERRED EMBODIMENTS

The rolling-bearing unit with reduction gear of this invention comprises, an outer ring or race having outer ring raceways formed on its inside circumferential surface, an inner ring or race having inner ring raceways formed on its outside circumferential surface and which face the outer ring raceways, several rolling bodies located between the outer ring raceways and inner ring raceways, a ring gear formed on the inside circumferential surface of a member which is affixed with respect to the outer ring or race and which is located away from the outer ring raceway in the axial direction, several support shafts which are connected respectively at their base portion at circumferential locations on the end face of the inner ring or race and arranged so that they are parallel to the outer and inner rings or races, and planetary gears which are rotatably supported around the support shafts and which mesh with the ring gear.

The rolling-bearing unit with reduction gear of this invention, constructed as described above, operates in the same way as the prior ball-bearing unit with reduction gear, in that the wheel axle is supported so that it rotates freely, and as the rpm transmitted from the drive shaft is reduced, the torque is increased and transmitted to the output section.

However, because the number of parts used is reduced in the rolling-bearing unit with reduction gear of this invention, manufacturing and assembly of the parts is simplified, and not only is the manufacturing cost reduced, but even if the parts are made thicker in order to maintain their required strength, an increase in the overall weight of the ball-bearing unit can be kept to a minimum.

Figure 1:
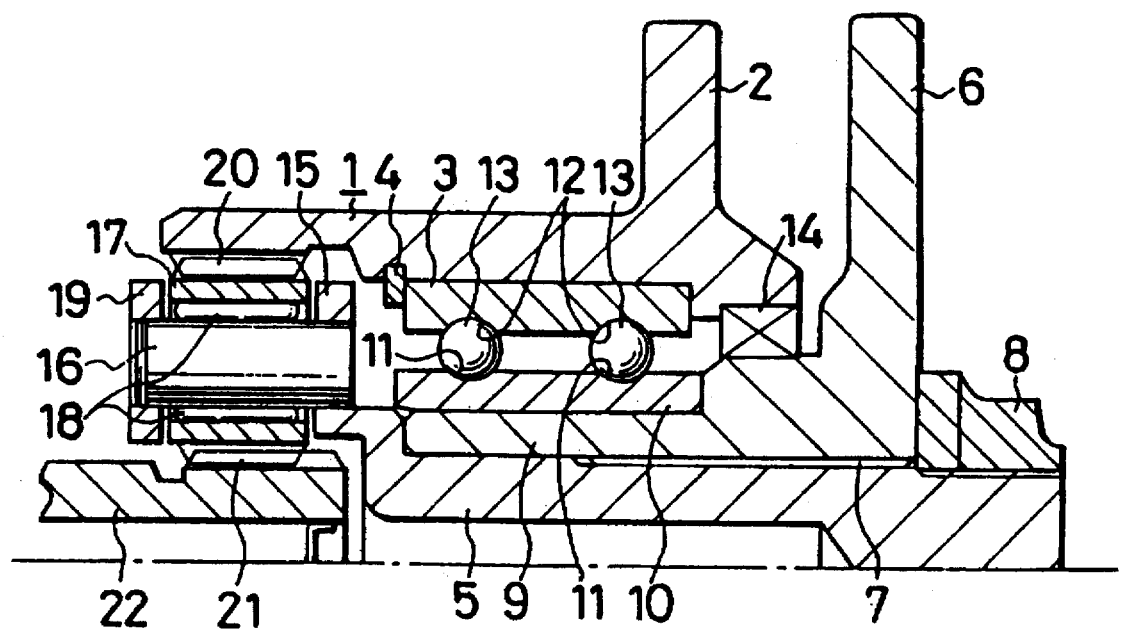
FIG. 1 is a cross sectional view of a conventional ball bearing unit with reduction gear.
Figure 2:
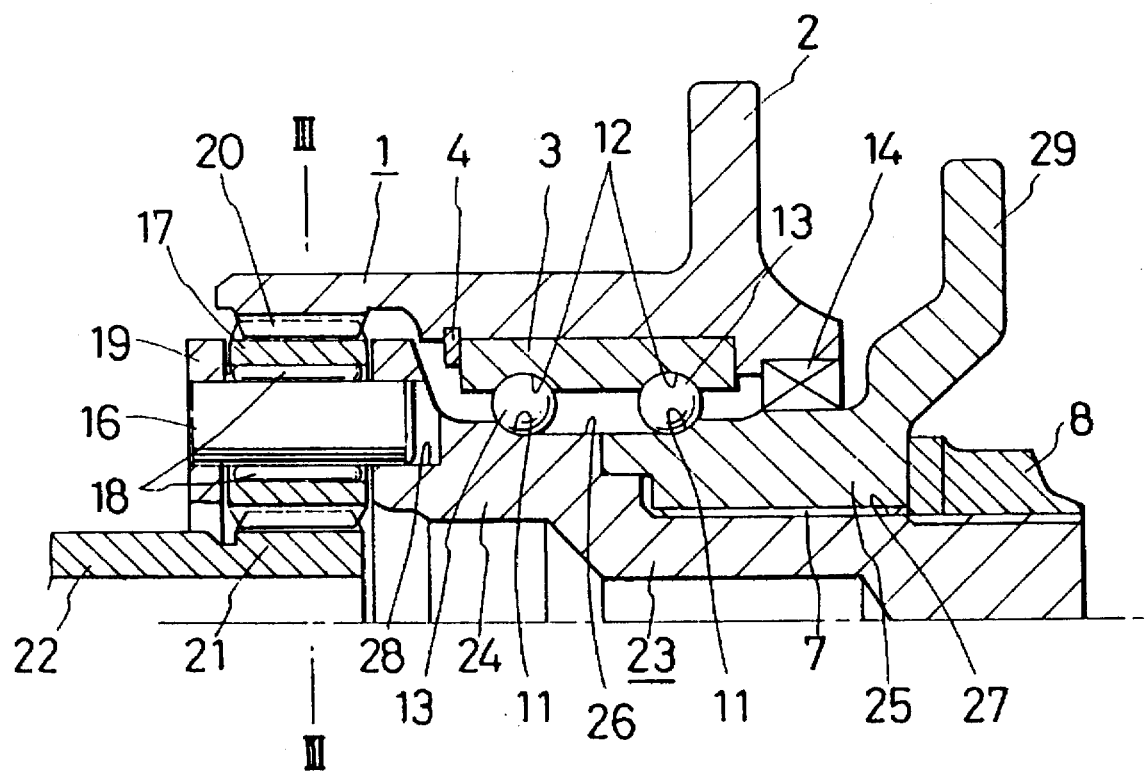
FIG. 2 is a cross sectional view of a first embodiment of the bearing unit of the present invention.
Figure 3:
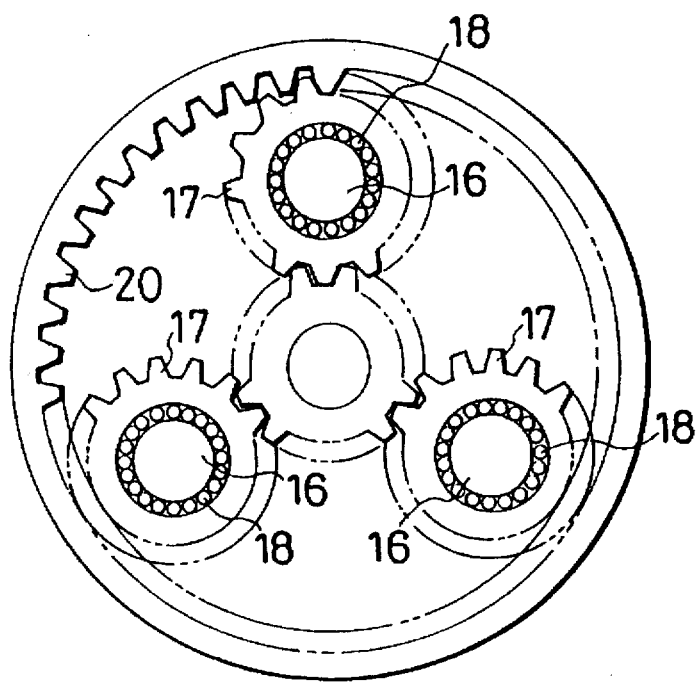
FIG. 3 is a view taken along the line III—III of FIG. 2.

Now FIGS. 2 to 3 show a first embodiment of this invention. Parts that are identical to parts in the prior construction shown in FIG. 1 are given the same code numbers, and a duplicate explanation of those parts will be omitted here. The characteristics of this invention will be given below.

The inner ring or race 23 is formed by putting together a main section 24 and sub section 25. There are inner ring raceways 11 formed around the outside circumferential surface of both the main section 24 and sub section 25. There are balls 13 in double rows located between the inner ring raceways 11 and the outer ring raceways 12 formed on the inside circumferential surface of the outer ring or race 3 which is fitted into the housing 1, allowing the inner ring or race 23 to rotate freely inside the housing 1.

The outside circumferential surface of the main section 24 comprises a large-diameter section 26 where one of the inner ring raceways 11 is formed, and a small-diameter section 27 located axially outward (toward the right in the FIG. 1) than the large-diameter section 26. The sub section 25 is fitted around this small-diameter section 27 with a spline joint 7 between them. Also, the sub section 25 is prevented from becoming separated from the main part 24 by a nut 8 screwed on to the axially outer end section (the right end in FIG. 2) of the main section 24. It is also possible to adjust the pressure applied to the balls 13 by adjusting the torque of the nut 8. The other of the inner ring raceways 11 is located on the sub section 25.

Moreover, there are a plurality of holes 28 that are formed circumferentially equally spaced around the axially inner end (the left end of FIG. 2) of the main section 24, and fitted into each of these holes 28 is the base portion of the support shafts 16. There are planetary gears 17 located around each of these support shafts 16, and which are supported by several rollers 18 so that they rotate freely. Each of these planetary gears 17 meshes with the ring gear 20 which is formed around the inside circumferential surface on the axially inner end section of the housing 1.

When the ball-bearing unit with reduction gear of this invention constructed as described above, is used, so that the wheel axle (not shown) is rotatably supported by the suspension (not shown), the housing 1 is supported by the suspension by way of the flange 2, and the wheel axle is affixed to and supported by the flange 29 formed on the sub section 25. Also, if the joint (not shown) is rotatably supported by the motor casing (not shown), the housing 1 is supported by the motor casing by way of the flange 2, and the installation section (not shown) of the joint is affixed to and supported by the flange 29.

Moreover, the sun gear 21 on the axially outer end of the drive shaft 22 (see FIG. 1) meshes with each of the planetary gears 17. In this condition, if the drive shaft 22 is caused to rotate, the rotation force is transmitted to the inner ring or race 23 from the drive shaft 22, and when the rpm is reduced, it is possible to transmit the increase in torque.

In more particular, in the ball-bearing unit with reduction gear of this invention, it is possible to reduce the number of parts used in its construction when compared to the prior construction as shown in FIG. 1, and thus it is possible to simplify part manufacturing and assembly, and reduce the cost of manufacturing. Also, even if the thickness of the parts is increased to maintain their required strength, it is possible to do so and still keep the increase in weight of the ball-bearing unit to a minimum.

For example, in the prior construction as shown in FIG. 1, the inner ring or race 10, the output shaft 5 and the output flange 6 are all independent, however, in the construction of this invention as shown in FIG. 2, the inner ring or race 23 is formed of a main section 24 and a sub section 25, and a flange 29 for attaching the wheel axle is integrally formed on this subsection 25 of the inner ring or race 23. In addition, there are support shafts 16 affixed to the inner ring or race 23 for supporting the planetary gears 17. Therefore, the number of required parts is reduced from three to two.

At the same time, there is no need to place so many parts (3 parts) on top of one another in the radial direction as in the prior construction as shown in FIG. 1, where the overall thickness is increased by placing parts having sufficient strength on top of one another. As a result, it is possible to reduce the weight of the total ball-bearing unit.

Further, the drive shaft 22 has a sun gear 21 at its axially outer end, and the sun gear 21 is interlocked with the planatary gear 17.

Figure 4:
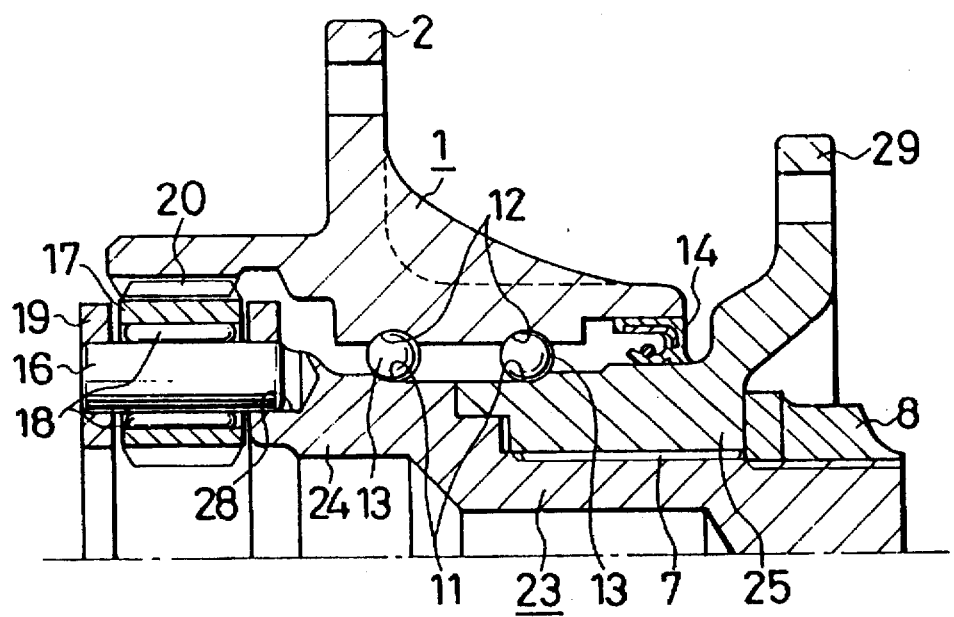
FIG. 4 is a cross sectional view of a second embodiment of the bearing unit of the present invention.

FIG. 4 shows a second embodiment of this invention. In the first embodiment of this invention described above, an independent outer race 3 is fitted into the housing 1, however in this embodiment, the outer ring raceways 12 in rows are formed directly on the inside circumferential surface of the housing 1, so that the housing per se functions as the outer race.

Also, in comparison to the first embodiment, this embodiment of the invention reduces even more the number of parts, and thus the manufacturing cost, and total weight of the ball-bearing unit can be reduced even further. The other construction and operation of this embodiment is substantially the same as that of the first embodiment, and so the same code numbers are given to identical parts and not explained here.

Figure 5:
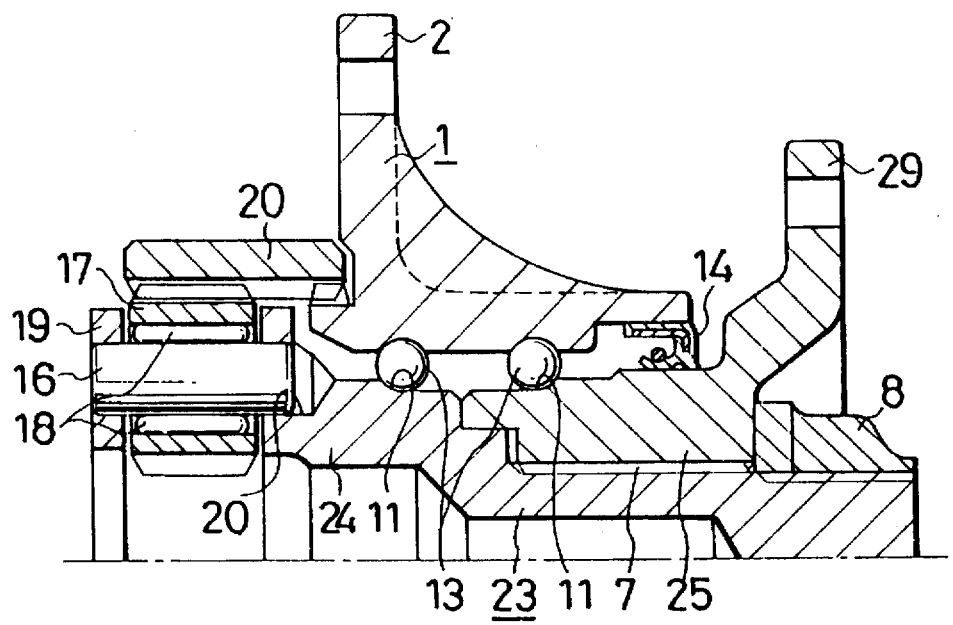
FIG. 5 is a cross sectional view of a third embodiment of the bearing unit of the present invention.

FIG. 5 shows a third embodiment of this invention. In both the first and second embodiments of the invention described above, the ring gear 20 and housing 1 are integrally formed as a single body, however in this embodiment, the ring gear 20 and the housing 1 are made as separate parts, and the ring gear 20 is connected to and affixed to the housing 1. With this kind of construction, the ring gear 20 is easier to manufacture. The other construction and operation of this embodiment is substantially the same as that of the first and second embodiments, and so the same code numbers are given to identical parts and an explanation is not given here.

Figure 6:
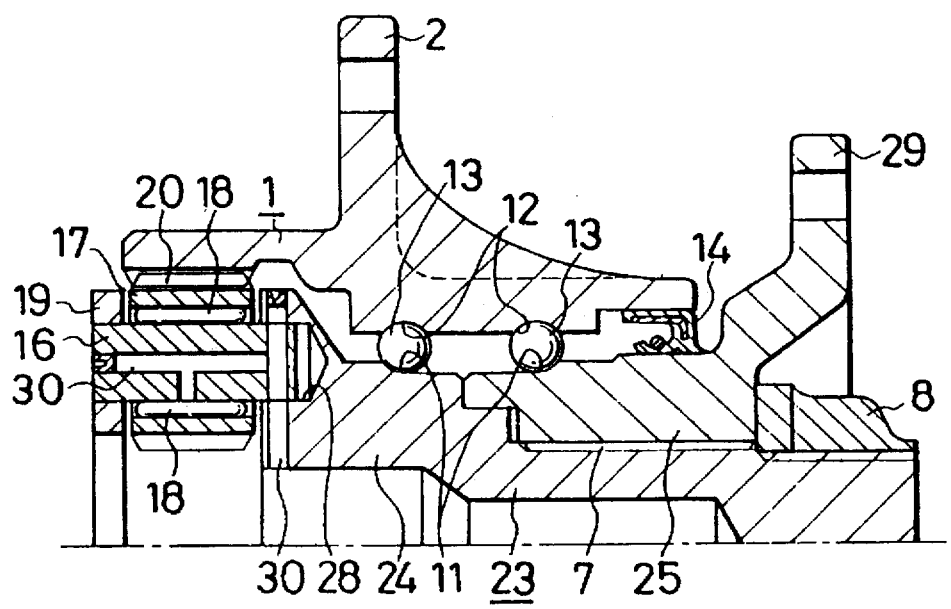
FIG. 6 is a cross sectional view of a forth embodiment of the bearing unit of the present invention.

FIG. 6 shows a fourth embodiment of this invention. In this embodiment of the invention, an oil path 30 is formed connecting for flow communication the axially inner end of the main section 24 of the inner ring or race 23, and the radially inside portion of each of the support shafts 16. One end of this oil path 30 opens to the the inside circumferential surface of the main section 24, and the other end opens to the outside circumferential surface of the support shafts 16 through the radially inside portion.

When using the ball-bearing unit with reduction gear, lubrication oil enters the oil path 30 from the opening on the side of the main section 24, and the oil moves along the path 30 and is applied to the rollers 18 from the opening on the other end. In doing so it is possible to lubricate the moving parts of the rollers 18. The other construction and operation of this embodiment is substantially the same as that of the other three embodiments, and so the same number codes are given to identical parts and an explanation is not given here.

In all of the embodiments of this invention described above, the housing 1 is secured to be stationary and the inner ring or race 23 is allowed to rotate, however, if this invention is to be used as a reduction gear for general industrial machinery, it is also possible to make the inner ring or race 23 stationary and allow the housing 1 to rotate.

Figure 7:
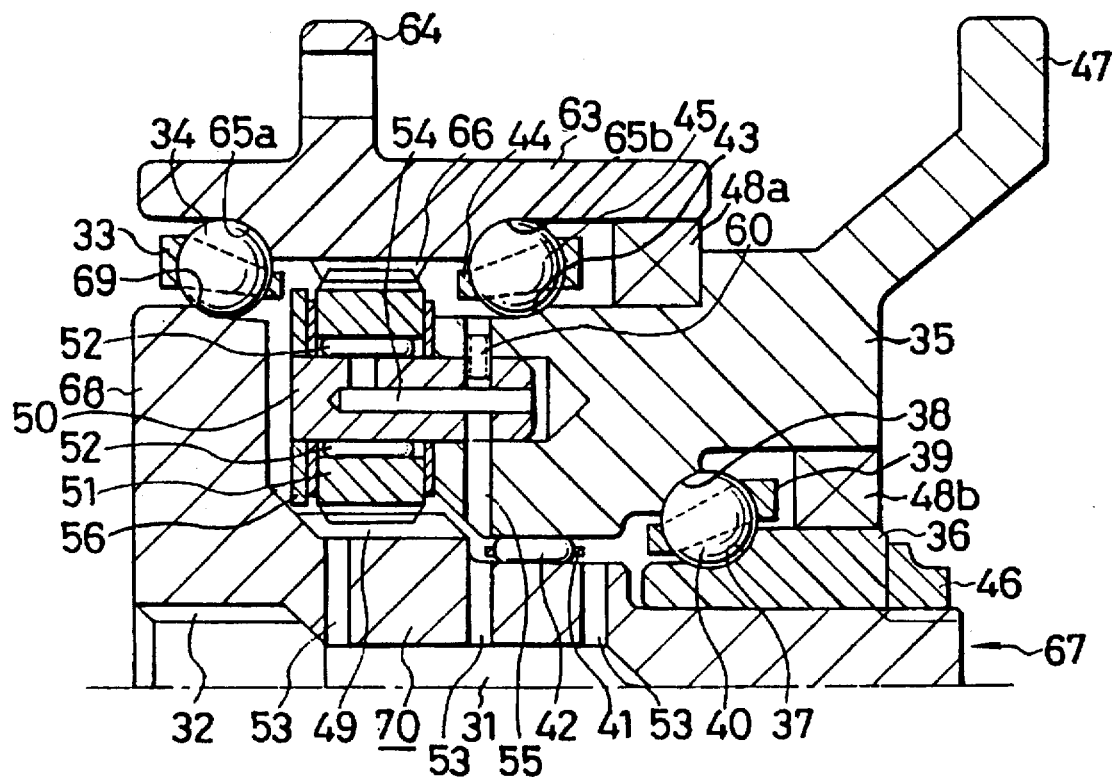
FIG. 7 is a cross sectional view of a fifth embodiment of the bearing unit of the present invention.

FIG. 7 shows a fifth embodiment of this invention. An installation flange 64 is formed around the outside circumferential surface of the outer ring or race 63 for supporting the outer ring or race 63 by the suspension or motor casing. A pair of outer ring raceways 65a, 65b are formed around the inside circumferential surface of the outer ring or race 63 with a sufficient space between them. Also, formed on the inside circumferential surface of the outer race 63, axially between the outer ring raceways 65a and 65b, is a ring gear 66.

The first ring or inner race 67 has a column shaped section 70. Around the outside circumferential surface of one axial end (the end on the left in FIG. 7) of this column shaped section 70, there is a large-diameter section 68 shaped like a outward facing flange. The first inner ring raceway 69 is formed around the outside circumferential surface of this large-diameter section 68, and this inner ring raceway 69 faces the outer ring raceway 65a. Between the first inner ring raceway 69 and the outer ring raceway 65a are several balls 34 in a row which are held by a retainer 33 so that they can turn freely, and they support the first inner ring or race 67 so that it rotates freely inside the outer ring or race 63.

In the center of the column shaped section 70, there is a circular hole 31 with a bottom which forms an opening on one axial end (the left end in FIG. 7) of the column shaped section 70. There is a spline groove 32 formed on the inside surface of this circular hole 31 near the opening of the hole.

Around the outside circumferential surface of this column shaped section 70, there is a sun gear 49 formed near the large-diameter section 68, so that this sun gear 49 faces the ring gear 66 of the outer ring or face 23.

The second inner ring or race 35 is supported around the column shaped section 70 of the first inner ring or race 67 so that it rotates freely around the column shaped section 70. In other words, an auxiliary inner ring or race 36 is fitted around the outside circumferential surface of the other axial end (the end on the right in FIG. 7) of the column shaped section 70, and this auxiliary inner ring or race 36 is prevented from coming out by a nut 46 screwed on the end of the column shaped section 70. Also, between the auxiliary inner ring raceway 37, formed around the outside circumferential surface of this auxiliary inner ring or race 36, and the auxiliary outer ring raceway 38, formed around the inside circumferential surface of the axially central section of the second inner ring or race 35, there are several balls 40 in a row held in a retainer 39 so that they turn freely.

Moreover, between the outside circumferential surface of the central section of the first inner ring or race 67 and the inside circumferential surface of one axial end of the second inner ring or race 35, there are several needle rollers 42 held in a retainer 41 so that they can turn freely. The several balls 40 and several needle rollers 42 support the second inner ring or race 35 so that it rotates freely with respect to the first inner ring or race 67, as well as support the loads applied to the second inner ring or race 35 in the thrust and radial directions.

There is a second inner ring raceway 43 formed around the outside circumferential surface of the second inner ring race 35 at its one axial end, so that it faces the other outer ring raceway 65b. Also, between this second inner ring raceway 43 and the other outer ring raceway 65b, there are several balls 45 in a row held in a retainer 44 so that they turn freely, and these balls support the second inner ring or race 35 so that it rotates freely inside the outer ring or race 63. In other words, this second inner ring or race 35 is supported so that it rotates freely, with respect to the outer ring or race 63 and first inner ring or race 67, between the inside circumferential surface of the outer race 63 and the outside circumferential surface of the column shaped section 70 which forms the the first inner ring or race 67. Around the outside circumferential surface of the other axial end (the right end in FIG. 7) of the second inner ring or race 35, there is formed a flange 47 for connecting the second ring or race 35 to the end of a transmission shaft (not shown) etc.

Moreover, the support shafts 50 are connected at their base portion to the second inner ring or race 35 at circumferential locations on one axial end of the second inner ring or race 35. Each of these support shafts 50 are arranged so that they are parallel with the outer ring or race 63 and the first and second inner ring or races 67, 35.

Also, there are planetary gears 51 rotatably supported around each of the support shafts 50 with several needle rollers 52 between them. These planetary gears 51 mesh with the ring gear 66 and sun gear 49. All of the ends of the support shafts 50 are connected together at the ends of the shafts 50 by a retaining ring 56.

A first seal ring 48a is located between the inside circumferential surface of the other axial end of the outer ring or race 63 and the outside circumferential surface of the central section of the second inner ring or race 35, and a second seal ring 48b is between the outside circumferential surface of the axial end of the auxiliary inner ring or race 36 and the inside circumferential surface of the axial other end of the second inner race 35, and they prevent dust or particles from getting into the areas where the balls 34, 40, 45 and needle rollers 42 are located, and they prevent lubrication oil form leaking out.

Furthermore, in a part of the first inner ring or race 67, there are through-holes 53 which connect the inside of the cicular hole 31 and the the outside surface of the column shaped section 70 for flow communicaiton. Also, a first through-hole 54 is formed inside the support shafts 50, and a second through-hole 55 is inside the second inner ring or race 35, so that these through-holes 54 and 55 are communicated with each other.

While the ball-bearing unit with reduction gear is operating, lubrication oil flows from inside the circular hole 31 to the inside of each of the through-holes 53, 55 and 54. All of the moving parts of the balls 34, 40, 45 and needle rollers 42, 52, and each of the areas where the gears 66, 49, 51 mesh with each other are lubricated from the oil flowing through each of the through-holes 53 thru 55. Between the through-holes 54 and 55 on the support shafts and second inner ring or race 35, there are anchoring pipes 60 which are used to ensure that the pair of through-holes 54 and 55 stay connected together.

In the ball-bearing unit with reduction gear of this invention constructed as described above, if the wheel axle (not shown) is to be rotatably supported by the suspension (not shown), the outer ring or race 63 is supported by the suspension by the installation flange 64, and the wheel axle is supported by and affixed to the flange 47 formed on the second inner ring or race 35. Also, to rotatably support the joint (not shown) by the motor casing (not shown), the outer ring or race 63 is supported by the motor casing by the installation flange 64, and the installation section of the joint is supported by and affixed to the flange 47. The end of the drive shaft (not shown) is connected in a spline joint relationship with the spline groove 32 formed in the circular hole 31. In this condition, if the drive shaft is caused to rotate, the rotation force is transmitted from the drive shaft to the second inner ring or race 35, and the rpm can be reduced while increasing the torque.

In other words, as the first inner ring or race 67 is caused to rotate by the drive shaft, the planetary gears 51, while each rotating on its axis, revolve around the sun gear 49 due to their meshing with the sun gear 49 formed around the outside surface of the first inner ring or race 67, and with the ring gear 66 formed on the inside surface of the outer ring or race 63. As a result, the second inner ring or race 35 rotates at the same rpm as the speed of the planetary gears 51 revoling around the sun gear 49.

When compared with the construction of the prior ball-bearing unit shown in FIG. 1, the ball-bearing unit with reduction gear of this invention, is constructed using fewer parts, and together with lowering the cost of manufacturing by simplifying the manufacture and assembly of the parts, it is possible to make the unit more compact. By making the unit more compact, it is possible to place another reduction gear mechanism in series with the first inner ring or race 67 and/or second inner ring or race 35. If another reduction gear mechanism is used, it is possible to increase the reduction ratio, or make the gears more compact.

Figure 8:
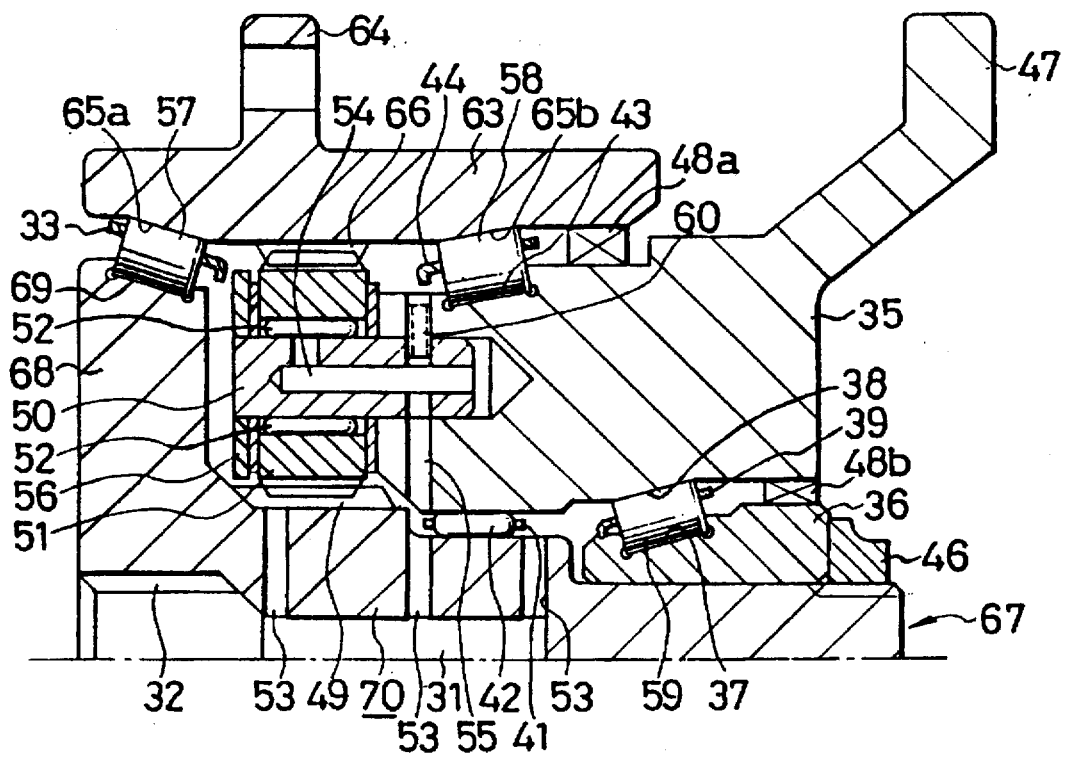
FIG. 8 is a cross sectional view of a sixth embodiment of the bearing unit of the present invention.

FIG. 8 shows a sixth embodiment of the invention. In this embodiment of the invention, instead of the balls 34 located between one of the outer ring raceway 65a and the first inner ring raceway 69, the balls 40 between the other outer ring raceway 65b and the second inner ring raceway 43, and the balls 45 between the auxiliary inner ring raceway 37 and the auxiliary outer ring raceway 38 in the fifth embodiment, conical rollers 57, 58, 59 are used, respectively. The other construction and operation is substantially the same as the fifth embodiment of the invention described above, and so the same code numbers are given to identical parts and no explanation is given here.

In the embodiments in FIG. 7 and FIG. 8, the outer ring or race 63 is secured to be stationary and the second inner ring or race 35 is rotated, however if the invention is used as a reduction gear apparatus for general industrial uses, it is possible to secure the second inner race 35 to a stationary member, and rotate the outer race 63.

If the ball-bearing unit with reduction gear of this invention is constructed and used as described above, it is possible to make the unit lighter, and manufacture it less expensively, thus it can play a very important role in realizing a practical electric automobile.

What is claimed is:

1. A bearing unit with a reduction gear, comprising:

an outer ring having an inside circumferential surface provided with at least one outer ring raceway;

an inner ring having an end face and comprising a first inner ring section and a second inner ring section so as to have an outside circumferential surface provided with at least one inner ring raceway opposed to the outer ring raceway;

a plurality of rolling bodies provided between the outer ring raceway and the inner ring raceway;

a plurality of support shafts provided parallel to the outer and inner rings and each having a base portion connected to the end face of the inner ring;

a plurality of planetary gears located around each of the support shafts;

a ring gear provided in an interlocking relationship with the planetary gears;

wherein the first inner ring section has a larger diameter section having an outside circumferential surface formed with an inner ring raceway, and a smaller diameter section positioned axially adjacent to the larger diameter section, and wherein the second inner ring section is fitted around the smaller diameter section of the first inner ring section in a spline-engagement relationship.

2. The bearing unit claim 1, wherein the base portion of each support shaft is fitted to the first inner ring section, each planetary gear is rotatably supported around the respective support shaft with rollers therebetween, and the ring gear is positioned axially away from the outer ring raceway.

3. The bearing unit of claim 2, wherein the ring gear is formed integrally with the outer ring.

4. The bearing unit of claim 2, wherein the first inner ring section has an oil path formed therein and each support shaft has an oil path formed therein and communicated with the oil path in the first inner ring section.

* * * * *